United States Patent [19]

Remmers

[11] Patent Number: 4,795,041

[45] Date of Patent: Jan. 3, 1989

[54] CHANNEL BASKET STOP

[75] Inventor: Lee Remmers, Ocala, Fla.

[73] Assignee: Clairson International, Ocala, Fla.

[21] Appl. No.: 929,777

[22] Filed: Nov. 13, 1986

[51] Int. Cl.⁴ .............................................. A47F 3/14
[52] U.S. Cl. ................................... 211/133; 312/348;
312/345
[58] Field of Search ................ 211/133, 189; 312/348,
312/342, 345; 248/221.4, 231.8

[56] References Cited

U.S. PATENT DOCUMENTS

| | | | |
|---|---|---|---|
| 2,130,279 | 9/1938 | Knight | 312/348 X |
| 3,019,071 | 1/1962 | Davis | 312/348 X |
| 3,836,106 | 9/1974 | Gray | 248/231.8 X |
| 4,650,261 | 3/1987 | Winter et al. | 211/189 |

FOREIGN PATENT DOCUMENTS 824093 11/1959 United Kingdom ................ 312/348

Primary Examiner—Ramon S. Britts
Assistant Examiner—Blair Johnson
Attorney, Agent, or Firm—Cushman, Darby & Cushman

[57] ABSTRACT

A C-shaped channel basket stop for a sliding basket support system is disclosed. The channel basket stop is slidably received on horizontal bars of the support system and includes at least one arm member which has a length such that when the channel stop is disposed on the horizontal bar, it will extend at least to a plane of a side of a basket disposed in the support system. This arm member will limit the amount which the basket may be pulled out of the sliding basket support system and may be removed and placed at another horizontal point along the basket.

10 Claims, 2 Drawing Sheets

CHANNEL BASKET STOP

BACKGROUND OF THE INVENTION

The present invention relates to basket stops and more particularly to a channel basket stop for a free-standing sliding basket support system.

Sliding basket support systems are known which include at least four vertical supports disposed so as to form a generally rectilinear support structure. The vertical supports are coupled together by means of horizontal bar members around at least three sides of the rectilinear structure. Baskets are slidably disposed in the horizontal bar members so that they may be enclosed within the rectilinear support structure or may be slid partly out of the open side thereof to reach items stored in the baskets.

One problem is that baskets so disposed in the support structure may be accidentally pulled completely out of the support structure. When this happens, the basket will fall spilling its contents and possibly injuring the person using the same. Accordingly, it would be desirable to provide a basket stop which would limit the extent to which the basket may be pulled out of the support structure so that the basket will not be accidentally pulled all the way out as discussed above. It would also be desirable to be able to remove such a basket stop when it is necessary to remove the basket in its entirety. Finally, it would be desirable to have a basket stop that may be placed at different points along the basket so that the extent to which the basket may be pulled out of the support structure can be varied in accordance with the contents thereof or the consumer's preference.

SUMMARY OF THE INVENTION

The present invention provides a basket stop for limiting the extent to which a basket may be pulled from a vertical support structure to overcome the problem of accidental basket removal. Further, the disclosed channel basket stop may be placed at various points so that the amount which the basket may be withdrawn from the support structure can be varied in accordance with the objects placed therein and/or the consumer's needs or desires.

Other objects, features, and advantageous characteristics of the present invention, and the combination of parts and economies of manufacture, will become apparent upon consideration of the following description and appended claims with reference to the accompanying drawings, all of which form a part of this specification, wherein like reference numerals designate corresponding parts in the various figures.

DETAILED DESCRIPTION OF THE PRESENTLY PREFERRED EMBODIMENT OF THE INVENTION

Figure 1:
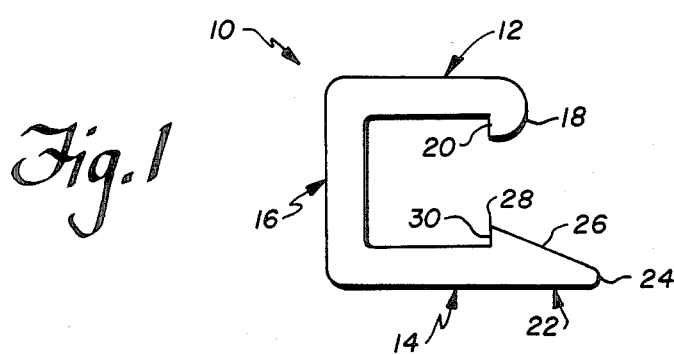
FIG. 1 is a front plan view of one embodiment of the channel basket stop of the present invention.

Referring to FIG. 1, the preferred embodiment of the channel basket stop of the present invention is shown. As can be seen, the channel basket stop 10 is generally C-shaped having a horizontally extending upper arm 12, a horizontally extending lower arm 14, and a vertical base member 16 extending between the rearward end portion of upper arm 12 and lower arm 14. The upper arm 12 includes a curved forward end portion 18 which defines a retaining means 20 as will be hereinafter described. Further, the lower arm 14 includes an elongated forward end portion 22 having a curved forwardmost end 24. The forward end portion 22 includes an inclined surface 26 which increases from a minimum height from forwardmost end 24 to a maximum height at the rearwardmost end 28 of forward end portion 22 so as to form a retaining means 30 as will be hereinafter described.

As will become apparent from the description below, the channel basket stop 10 may be formed of any material that can be resiliently flexed. In the presently preferred embodiment, however, the channel basket stop 10 is formed from a plastic material so that it may be inexpensively and quickly formed by for example injection molding.

Figure 2:
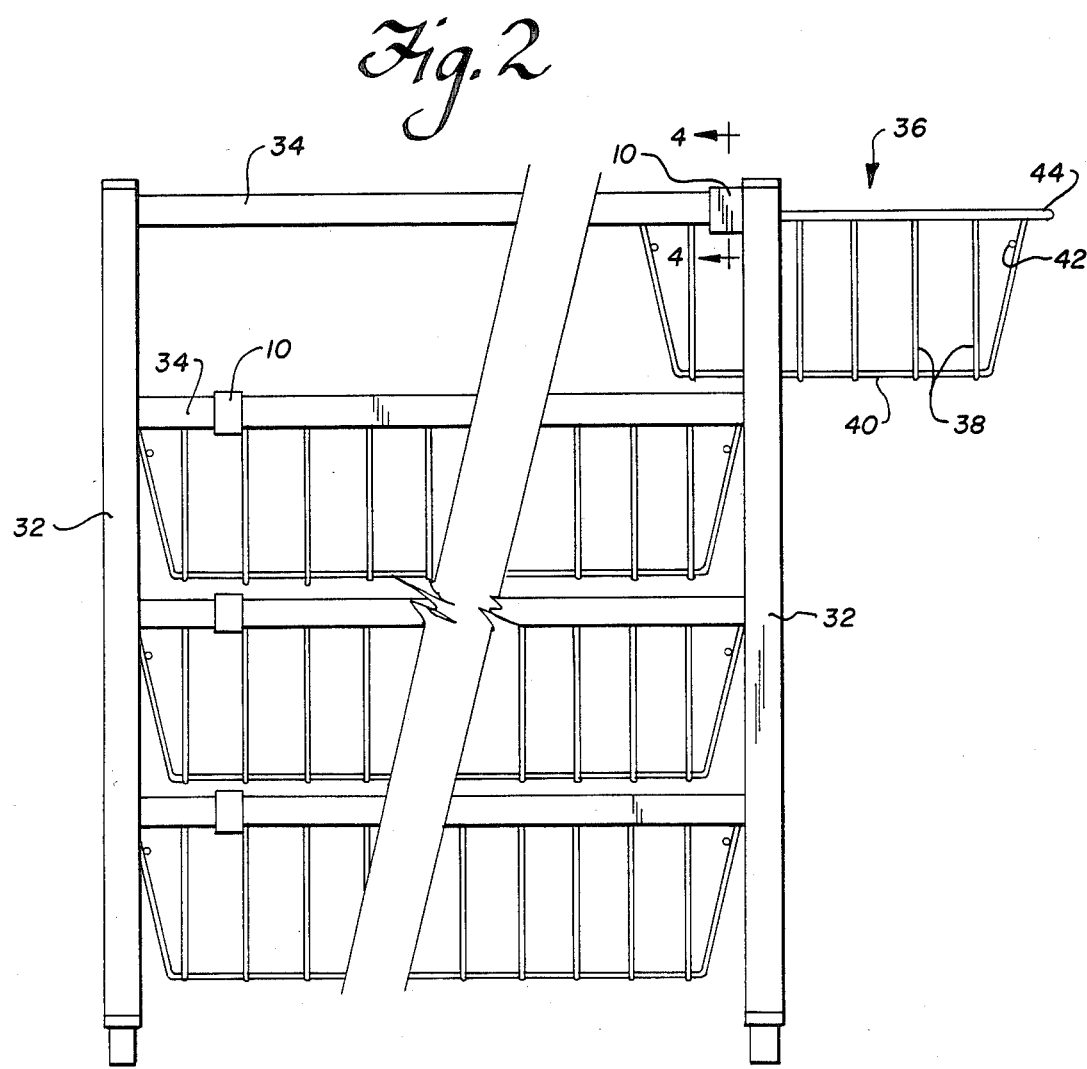
FIG. 2 is a side plan view of a sliding basket support system for baskets incorporating the channel basket stop of the present invention.

Turning now to FIG. 2, a vertical support system for sliding baskets incorporating the channel basket stop of the present invention is shown. The vertical support system includes at least four vertical support members 32 suitably connected together, two of which are shown in the view of FIG. 2. The vertical support system further includes a plurality of horizontal bar members 34 which extend between adjacent vertical support members 32 so as to form a generally rectilinear support structure. The horizontal bar members 34 are preferably provided on at least two but no more than three of the sides of the rectilinear support structure so that baskets 36 provided on the support structure may be removed from the fourth, open side of the vertical support structure. The vertical support members 32 may be made of any suitable material such as, for example, wood, metal, or plastic. Similarly the vertical support members 32 may be formed of any desired cross-sectional shape such as, for example, circular, elliptical, square or rectangular. In the preferred embodiment, however, the vertical support members 32 are generally hollow, square metal tubes which are welded together and coated with a suitable material so as to be aesthetically pleasing and resistant to scratching. Such a coating may be, for example, a polymeric coating.

The baskets 36 are of the type having a number of crosswise elements 38 and a number of lengthwise elements 40. Each basket further preferably includes at least one circumferential element 42 and a top circumferential rim 44. The rim 44 is adapted to be slidingly received by the horizontal bar members 44 as will be hereinafter described. Each of the crosswise, lengthwise, and circumferential elements of the basket may be formed of any suitable semi-rigid or rigid material such as, for example, metal or plastic. In the preferred embodiment, however, the elements of the basket are formed from a rigid metal rod that is coated with a suitable protective coating of, for example, polymeric material. The coating provided on the baskets as well as the coating which is preferably provided on the vertical supports may be pigmented in accordance with the consumer's taste so as to provide an aesthetically pleasing basket support system.

Figure 3:
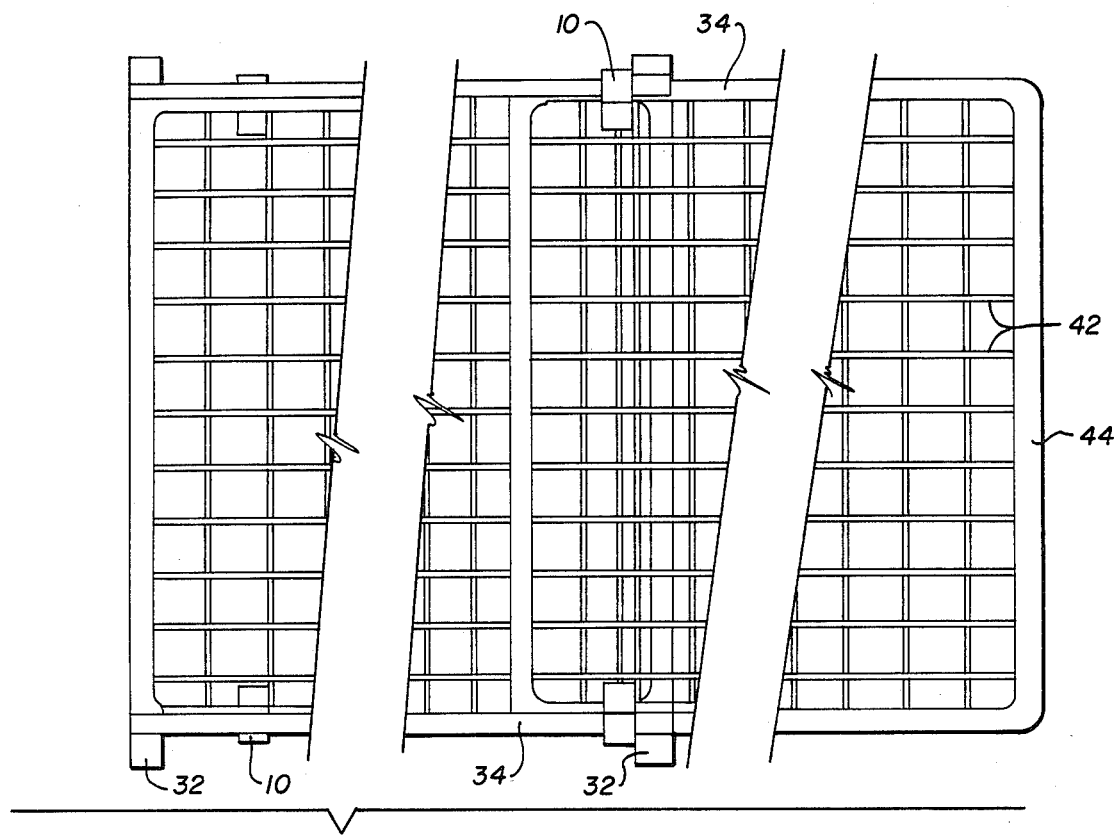
FIG. 3 is a top plan view of the support system shown in FIG. 2.

As can be seen in FIGS. 2 and 3, a channel basket stop 10 is provided on each of the horizontal bar members 34 on each side of the support system as will be hereinafter described.

Referring to FIG. 3 as well as FIG. 2, it can be seen that channel basket stop 10 limits the extent to which a basket 36 may be withdrawn from the vertical support structure. More particularly, as the basket 36 is withdrawn from the support structure, a channel basket stop 10 provided on each of the horizontal bar members 34 slides with the basket 36 and abuts the vertical support members 32 adjacent the open side of the vertical support structure so as to selectively prevent a basket 36 from being completely removed from the support structure.

Figure 4:
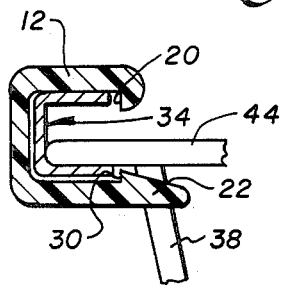
FIG. 4 is a plan view, partly in crosssection, taken along line 4—4 of FIG. 2.
Figure 5:
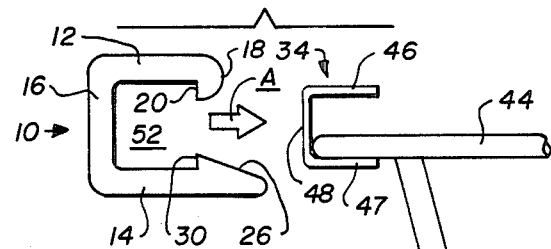
FIG. 5 is a front plan view showing the manner in which the channel basket stop of the present invention is coupled to the support system.

Turning now to FIGS. 4 and 5 the manner in which the channel basket stop 10 of the present invention is operatively coupled to a horizontal bar member 34 so as to limit tee removal of a basket 36 is shown. In the preferred embodiment, the horizontal bar member 34 is generally C-shaped in cross section with longitudinally extending upper and lower portions 46 and 47, respectively, and longitudinally extending vertical portion 48 so as to form a cavity 50. As can be seen in FIGS. 4 and 5, the cavity 50 receives the rim 44 of a basket 36 so that the rim 44 is slidable along the upper surface of the lower portion 47.

Referring to FIG. 5, the channel basket stop 10 is mounted to the horizontal bar member 34 by moving the channel basket stop 10 in the direction indicated by arrow A. When the channel basket stop 10 is moved in this manner the curved forward portion 18 of upper arm 12 and the inclined surface 26 of the lower arm 14 engage the upper and lower portions 46 and 47, respectively, of the horizontal bar member 34 so as to deflect the first and second arms 12 and 14 of stop 10 upwardly and downwardly, respectively. The inner length of arm 12 between vertical base member 16 and retaining means 20 is greater than the cross-sectional length of upper portion 46 of horizontal bar member 34. Similarly, the inner length of lower arm 14 between vertical base member 16 and retaining means 30 is greater than the cross-sectional length of lower portion 47 as shown in FIG. 4. Further, the inner length of vertical base member 16 is greater than the cross-sectional length of vertical portion 48. Thus, the cavity 52 formed by upper arm 12, lower 14, and vertical base member 16 is greater than the cross section of the horizontal bar member. As a result, when the channel basket stop 10 is placed about the horizontal bar member 34, the deflected arms 12 and 14 will return to their undeflected position and the stop 10 will be slidable longitudinally relative to the bar member 34. Furthermore, the retaining means 20 and 30 will retain the stop 10 on the horizontal bar member 34. As can be further seen in FIG. 4, when the channel basket stop 10 is coupled to the horizontal bar member 34 as described above the forward end portion 22 of lower arm 14 of the stop 10 will extend at least to and preferably beyond a plane of a side of basket defined by a vertically extending portion of the crosswise elements 38. In this manner, a channel basket stop 10 coupled at a point along the depth of the basket will be limited to movement between adjacent elements 38 as will be described hereinafter.

Figure 6:
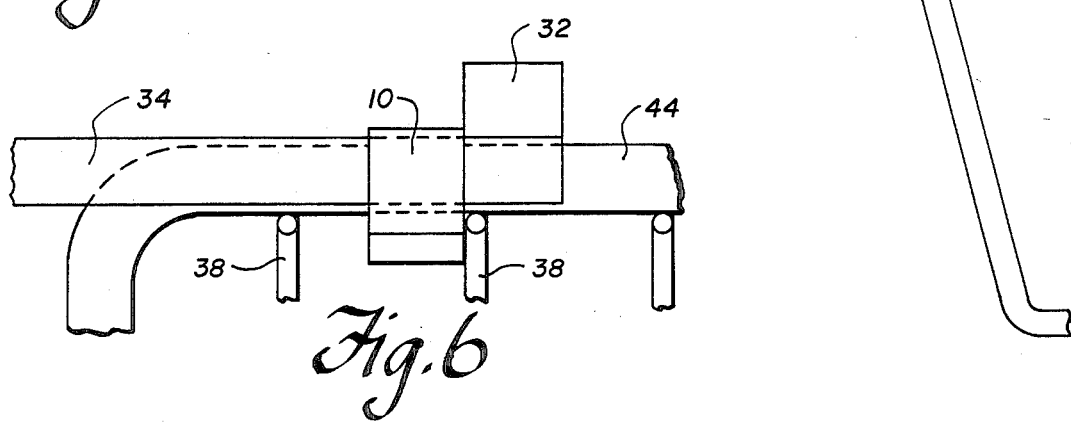
FIG. 6 is an enlarged top plan view of a portion of FIG. 3 showing the manner in which the channel basket stop of the present invention limits the removal of a basket.

As can be understood from the foregoing discussion and particularly with reference to FIGS. 2, 3 and 6, when a channel basket stop 10 has been coupled about a horizontal bar member 34 with a basket 36 slidably received therein, and the basket 36 is subsequently pulled in the direction B shown in FIG. 2, the crosswise elements 38, having the end portion 22 of arm 14 of stop 10 therebetween will cause the stop 10 to similarly move in the direction B until such point as it engages a vertical support 32. When stop 10 abuts vertical support 32 and is thereby prevented from further movement in direction B, the basket 36 will be precluded from further movement in direction B by the engagement of end portion 22 with crosswise element 38 disposed rearwardly on the basket 36 relative to the stop 10.

As is further apparent from the foregoing, a stop 10 may be provided anywhere along a bar member 34 so as to control the amount which the basket 36 may be pulled out of the support structure. Similarly, a stop 10 provided along the length of horizontal bar member 34 may be removed in its entirety so that a basket 36 may be completely removed from the support structure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A channel shelving system including at least one sliding basket, comprising:
   at least four vertical support members disposed in a rectangular array, including a forward most pair of vertical support members and a rearward most pair of vertical support members;
   at least one pair of horizontal bar members, each horizontal bar member of said pair being coupled to a forward vertical support member and a rearward support so as to be horizontally disposed on opposite sides of said rectilinear array;
   at least one basket means, each said basket means being slidably received on and disposed between a pair of horizontal bar members; and
   means for limiting the movement of said basket means in a forward direction relatively to said forward most pair of support members, said means for limiting being C-shaped, being longitudinally slidably disposed on at least one horizontal bar member of each said pair, and comprising an upper arm member, a lower arm member, and a vertical base member, at least one of said upper and lower arm members having a length extending from a vertical plane of said at least one horizontal bar member to a plane of a side of said basket means when said limiting means is disposed on said at least one horizontal bar member.

2. A channel shelving system as claimed in claim 1, wherein at least one of said upper and lower arm members includes means for retaining said limiting means on said horizontal bar member.

3. A channel shelving system as claimed in claim 1, wherein said at least one arm member is said upper arm member.

4. A channel shelving system as claimed in claim 2, wherein both said upper arm member and said lower arm member each include means for retaining.

5. A channel shelving system as claimed in claim 1, wherein at least one of said upper and lower arm members includes means for deflecting the same as said limiting means is mounted on said horizontal bar member.

6. A channel shelving system as claimed in claim 5, wherein said means for deflecting includes an inclined surface formed on said at least one arm member.

7. A channel shelving system as claimed in claim 5, wherein said means for deflecting includes a curve end portion formed on said at least one arm member.

8. A channel shelving system as claimed n claim 5, wherein both said upper and lower arm members include means for deflecting.

9. A channel shelving system as claimed in claim 7, wherein the means for deflecting said upper arm member includes a curved end portion and said means for deflecting said lower arm member includes an inclined surface.

10. A channel shelving system as claimed in claim 1, wherein said means for limiting are slidably disposed on each horizontal bar member of each said pair, at least one of said upper and lower arm members of each said limiting means having a length extending from a vertical plane of a horizontal bar member on which it is mounted to a plane of a side of said basket means disposed between each said pair of horizontal bar members.

* * * * *